US011563774B2

(12) United States Patent
Paquet (10) Patent No.: US 11,563,774 B2
(45) Date of Patent: Jan. 24, 2023

(54) SYSTEMS AND METHODS FOR TRACKING AND IDENTIFYING PHISHING WEBSITE AUTHORS (71) Applicant: Activision Publishing, Inc., Santa Monica, CA (US)

(72) Inventor: Philippe Louis Yves Paquet, Beverly Hills, CA (US)

(73) Assignee: Activision Publishing, Inc., Santa Monica, CA (US)

(*) Notice: Subject to any disclaimer, the term of this patent is extended or adjusted under 35 U.S.C. 154(b) by 222 days.

(21) Appl. No.: 17/118,112

(22) Filed: Dec. 10, 2020

(65) Prior Publication Data
US 2021/0203694 A1 Jul. 1, 2021

Related U.S. Application Data (60) Provisional application No. 62/954,048, filed on Dec. 27, 2019.

(51) Int. Cl.
H04L 29/06 (2006.01)
H04L 9/40 (2022.01)
G06F 16/957 (2019.01)
H04L 61/5007 (2022.01)
H04L 101/663 (2022.01)

(52) U.S. Cl.
CPC ...... H04L 63/1483 (2013.01); G06F 16/9574 (2019.01); H04L 61/5007 (2022.05); H04L 63/1466 (2013.01); H04L 2101/663 (2022.05); H04L 2463/146 (2013.01)

(58) Field of Classification Search
CPC ............. H04L 63/1483; H04L 63/1466; G06F 16/9574
See application file for complete search history.

(56) References Cited

U.S. PATENT DOCUMENTS

| 5,530,796 | A | 6/1996 | Wang |
| 5,561,736 | A | 10/1996 | Moore |
| 5,563,946 | A | 10/1996 | Cooper |
| 5,685,775 | A | 11/1997 | Bakoglu |
| 5,706,507 | A | 1/1998 | Schloss |
| 5,708,764 | A | 1/1998 | Borrel |

(Continued)

FOREIGN PATENT DOCUMENTS

| AU | 768367 | 3/2004 |
| AU | 2005215048 | 10/2011 |

(Continued)

Primary Examiner — Wasika Nipa
(74) Attorney, Agent, or Firm — Novel IP (57) ABSTRACT A method of tracking phishing activity is disclosed. A request to download a webpage hosted as part of a legitimate website on a server is initiated. The request includes identification data pertaining to at least one user computing device. The identification data is extracted from the request. A unique identifier corresponding to the extracted identification data is generated. Fingerprint data is generated using at least a subset of the extracted identification data. The unique identifier, the extracted identification data and the fingerprint data is stored. The fingerprint data is encoded into a program and/or data associated with the webpage to generate a modified webpage. The modified webpage is transmitted from the server to the user computing device in response to the request.

6 Claims, 5 Drawing Sheets (56) References Cited

U.S. PATENT DOCUMENTS

| | | |
|---|---|---|
| 5,736,985 A | 4/1998 | Lection |
| 5,737,416 A | 4/1998 | Cooper |
| 5,745,678 A | 4/1998 | Herzberg |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,525,731 B1 | 2/2003 | Suits |
| 6,549,933 B1 | 4/2003 | Barrett |
| 6,567,109 B1 | 5/2003 | Todd |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,028,296 B2 | 4/2006 | Irfan |
| 7,062,533 B2 | 6/2006 | Brown |
| 7,143,409 B2 | 11/2006 | Herrero |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |

(56) References Cited

U.S. PATENT DOCUMENTS

| | | |
|---|---|---|
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2009/0113448 A1 | 4/2009 | Smith |
| 2014/0344725 A1 | 11/2014 | Bates |
| 2016/0191671 A1 | 6/2016 | Dawson |
| 2019/0132356 A1* | 5/2019 | Vargas Gonzalez ......... H04L 63/1425 |
| 2021/0075833 A1* | 3/2021 | Harrison ............. H04L 61/2514 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |

(56) References Cited

FOREIGN PATENT DOCUMENTS

| | | |
|---|---|---|
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

\* cited by examiner

SYSTEMS AND METHODS FOR TRACKING AND IDENTIFYING PHISHING WEBSITE AUTHORS

CROSS-REFERENCE

The present application relies on, for priority, U.S. Patent Provisional Application No. 62/954,048, titled "Systems and Methods for Tracking and Identifying Phishing Website Authors" and filed on Dec. 27, 2019. The above-referenced application is herein incorporated by reference in its entirety.

FIELD

The present application relates to computer security. More particularly, the present application relates to systems and methods of tracking phishing activity associated with at least one webpage hosted as part of a legitimate website on at least one server.

BACKGROUND

The continued explosive growth in the number of users of the Internet and electronic messaging (such as email and instant messaging) is also associated with increased criminal and illegal activity through these digital communication technologies. One such fraudulent activity is phishing, which thrives on the internet. As described by Wikipedia, phishing can be defined as a fraudulent attempt to obtain sensitive information such as usernames, passwords, and credit card details by disguising oneself as a trustworthy entity in an electronic communication. Typically carried out by email spoofing or instant messaging, it often directs users to enter personal information at a fake website which matches the look and feel of a legitimate site. Users are often lured by communications purporting to be from trusted parties such as social web sites, auction sites, banks, online payment processors or IT administrators.

Approaches have been developed to prevent phishing attacks. For example, spam filters can reduce the number of phishing emails that reach users' inboxes. Another approach to fighting phishing is to maintain a list of known phishing sites and to check websites against the list. One such service is the Safe Browsing service. Web browsers such as Google Chrome, Internet Explorer 7, Mozilla Firefox 2.0, Safari 3.2, and Opera contain this type of anti-phishing measure. Also, many companies offer banks and other organizations likely to suffer from phishing scams round-the-clock services to monitor, analyze and assist in shutting down phishing websites.

However, there is still a need to be able to track phishing websites and identify offenders associated with the phishing websites. It is also desirable to accomplish tracking of phishing websites in a manner that the offenders are unable to detect that their phishing websites are being tagged with tracking and identification data.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification discloses a computer-implemented method of tracking phishing activity targeting a webpage that is part of a website which is hosted on at least one server, wherein the at least one server is in data communication with at least one user computing device over a network and wherein the at least one user computing device is configured to initiate a request to the at least one server to download the webpage, the method comprising: receiving, at the at least one server, the request to download the webpage, wherein the request includes identification data pertaining to the at least one user computing device; extracting, at the at least one server, one or more of the identification data from the request; generating, at the at least one server, a unique identifier corresponding to the one or more of the identification data; using, at the at least one server, at least a subset of the one or more of the identification data to generate fingerprint data; storing, at the at least one server, the unique identifier, the one or more of the identification data, and the fingerprint data, wherein the unique identifier is stored in association with the one or more of the identification data and the fingerprint data; encoding, at the at least one server, the fingerprint data into a program code and/or data associated with the webpage to generate a modified webpage; and transmitting the modified webpage with the fingerprint data from the at least one server to the user computing device in response to the request.

Optionally, the one or more of the identification data comprises at least one of an IP address of the user computing device, an IP-based geo-location of the user computing device, TCP/IP fingerprint parameters, HTTP header fields or IP Address Whois data.

Optionally, a size of the fingerprint data ranges from 64 bits to 256 bits.

Optionally, after the encoding, the fingerprint data within the program code and/or data is visually undetectable by humans.

Optionally, the encoding comprises at least one of adding the fingerprint data to the program code and/or data or replacing a portion of the program code and/or data with the fingerprint data.

Optionally, the method further comprises downloading, at the at least one server, the modified webpage from a potentially phishing website; decoding, at the at least one server, the modified webpage to retrieve the fingerprint data; accessing, at the at least one server, the unique identifier associated with the retrieved fingerprint data; accessing, at the at least one server, the one or more of the identification data using the accessed unique identifier; and identifying the user computing device based on the accessed one or more of the identification data.

In some embodiments, the present specification discloses a computing system configured to track phishing activity targeting a webpage that is part of a website comprising: at least one server, wherein the at least one server is in data communication with at least one remotely located user computing device over a network, wherein the at least one server is configured to receive a request from the at least one remotely located user computing device to acquire data indicative of the webpage, and wherein the at least one server comprises at least one processor and programmatic instructions that, when executed by the at least one processor: receives the request to download the webpage, wherein the request includes identification data pertaining to the at least one user computing device; extracts at least a portion of the identification data from the request; generates a unique identifier corresponding to the portion of the identification data; stores the unique identifier and the portion of the identification data, wherein the unique identifier bears an association with said one or more of the plurality of identification data; encodes the unique identifier into a program code and/or data associated with the webpage such that the unique identifier is visually undetectable by a human in the program code of the webpage or in the rendered version of webpage, thereby generating a modified webpage; and transmits the modified webpage from the at least one server to the user computing device in response to the request.

Optionally, the identification data comprises at least one of an IP address of the at least one user computing device, an IP-based geo-location of the at least one user computing device, TCP/IP fingerprint parameters indicative of the at least one user computing device, HTTP header fields indicative of the at least one user computing device and IP Address Whois data indicative of the at least one user computing device.

Optionally, a size of the unique identifier ranges from 64 bits to 256 bits.

Optionally, said encoding comprises at least one of adding the unique identifier to the program code and/or data or replacing a portion of the program code and/or data with the unique identifier.

Optionally, the programmatic instructions, when executed by the at least one processor: downloads the modified webpage from a potentially phishing website; decodes the modified webpage to retrieve the fingerprint data; accesses the unique identifier associated with the retrieved fingerprint data; accesses the one or more of the identification data using the accessed unique identifier; and identifies the user computing device based on the accessed one or more of the identification data.

In some embodiments, the present specification discloses a computer readable non-transitory medium comprising a plurality of executable programmatic instructions wherein, when said plurality of executable programmatic instructions are executed by a processor, a process is performed for tracking phishing activity targeting a webpage that is part of a website which is hosted on at least one server, wherein the at least one server is in data communication with at least one user computing device over a network, and wherein the at least one server is configured to receive a request to the access the webpage from the at least one user computing device, said plurality of executable programmatic instructions comprising: programmatic instructions, stored in the computer readable non-transitory medium, that, when executed, receive the request to access the webpage, wherein the request includes identification data related to the at least one user computing device; programmatic instructions, stored in the computer readable non-transitory medium, that, when executed, obtain one or more of the identification data from the request; programmatic instructions, stored in the computer readable non-transitory medium, that, when executed, generate a unique key corresponding to the one or more of the identification data; programmatic instructions, stored in the computer readable non-transitory medium, that, when executed, generate fingerprint data, wherein the fingerprint data is a function of at least a portion of the one or more of the identification data; programmatic instructions, stored in the computer readable non-transitory medium, that, when executed, store the unique identifier, the one or more of the identification data and the fingerprint data; programmatic instructions, stored in the computer readable non-transitory medium, that, when executed, encodes the fingerprint data into a program code and/or data associated with the webpage such that the unique identifier is visually or audially concealed in the program code of the webpage or in the rendered version of webpage, thereby generating to generate a modified webpage; and programmatic instructions, stored in said computer readable non-transitory medium, that, when executed, transmit the modified webpage from the at least one server to the user computing device in response to the request.

Optionally, the identification data comprises at least one of an IP address of the at least one user computing device, an IP-based geo-location of the at least one user computing device, TCP/IP fingerprint parameters indicative of the at least one user computing device, HTTP header fields indicative of the at least one user computing device and IP Address Whois data indicative of the at least one user computing device.

Optionally, a size of the fingerprint data ranges from 64 bits to 256 bits.

Optionally, the computer readable non-transitory medium further comprises downloading and decoding, at the at least one server, the modified webpage to retrieve the fingerprint data, the modified webpage being downloaded from a phishing website; accessing, at the at least one server, the unique identifier associated with the retrieved fingerprint data; accessing, at the at least one server, said one or more of the plurality of identification data using the accessed unique identifier; and identifying the user computing device based on said accessed one or more of the plurality of identification data.

Optionally, said encoding comprises at least one of adding the unique identifier to the program code and/or data or replacing a portion of the program code and/or data with the unique identifier.

Optionally, the computer readable non-transitory medium further comprises programmatic instructions, stored in the computer readable non-transitory medium, that, when executed: download the modified webpage from a potentially phishing website; decode the modified webpage to retrieve the fingerprint data; access the unique identifier associated with the retrieved fingerprint data; access the one or more of the identification data using the accessed unique identifier; and identify the user computing device based on the accessed one or more of the identification data.

Optionally, the computer readable non-transitory medium further comprises programmatic instructions, stored in the computer readable non-transitory medium, that, when executed, applies a cryptographic hash function is applied to the portion of the one or more of the identification data in order to generate the fingerprint data.

Optionally, the computer readable non-transitory medium further comprises programmatic instructions, stored in the computer readable non-transitory medium, that, when executed, generates the fingerprint data using the portion of the one or more of the identification data and at least a portion of the unique identifier.

Optionally, the computer readable non-transitory medium further comprises programmatic instructions, stored in the computer readable non-transitory medium, that, when executed, generates the fingerprint data by applying a cryptographic hash function to the portion of the one or more of the identification data and at least a portion of the unique identifier.

Optionally, the computer readable non-transitory medium further comprises programmatic instructions, stored in the computer readable non-transitory medium, that, when executed, encode the fingerprint data by using a tab instead of a space at one or more locations within the program code and/or textual data associated with the webpage.

Optionally, the computer readable non-transitory medium further comprises programmatic instructions, stored in the computer readable non-transitory medium, that, when executed encode the fingerprint data by modifying at least one of a resolution or a color depth of image data in the webpage.

Optionally, the computer readable non-transitory medium further comprises programmatic instructions, stored in the computer readable non-transitory medium, that, when executed, encode the fingerprint data by modifying the audio data in the webpage.

Optionally, the computer readable non-transitory medium further comprises programmatic instructions, stored in the computer readable non-transitory medium, that, when executed, modifies the audio data by adding noise indicative of the fingerprint data.

The aforementioned and other embodiments of the present specification shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings.

DETAILED DESCRIPTION

The term "module or engine" used in this disclosure may refer to computer logic utilized to provide a desired functionality, service, or operation by programming or controlling a general purpose processor. In various embodiments, a module can be implemented in hardware, firmware/software or any combination thereof. The module may be interchangeably used with unit, logic, logical block, component, or circuit, for example. The module may be the minimum unit, or part thereof, which performs one or more particular functions.

The term "server" used in this disclosure should be understood to refer to a service point which provides processing, database, and communication facilities. As such, therefore, the term "server" may refer to a single, physical processor with associated communications and data storage and database facilities, or it may refer to a networked or clustered complex of processors and associated network and storage devices, as well as operating software and one or more database systems and applications software which support the services provided by the server.

In various embodiments, a "computing device" includes an input/output controller, at least one communications interface and system memory. In various embodiments, the computing device includes conventional computer components such as a processor, necessary non-transient memory or storage devices such as a RAM (Random Access Memory) and disk drives, monitor or display and one or more user input devices such as a keyboard and a mouse. In embodiments, the user input devices allow a user to select objects, icons, and text that appear on the display via a command such as a click of a button on a mouse or keyboard or alternatively by touch in embodiments where the display is a touch-enabled screen. The computing device may also include software that enables wireless or wired communications over a network such as the HTTP, TCP/IP, and RTP/RTSP protocols. These elements are in communication with a central processing unit (CPU) to enable operation of the computing device. In various embodiments, the computing device may be a conventional standalone computer, a mobile phone, a tablet or a laptop. In some embodiments, the functions of the computing device may be distributed across multiple computer systems and architectures.

In some embodiments, execution of a plurality of sequences of programmatic instructions or code enables or causes the CPU of the computing device to perform various functions and processes. In alternate embodiments, hardwired circuitry may be used in place of, or in combination with, software instructions for implementation of the processes of systems and methods described in this application. Thus, the systems and methods described are not limited to any specific combination of hardware and software.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

Figure 1:
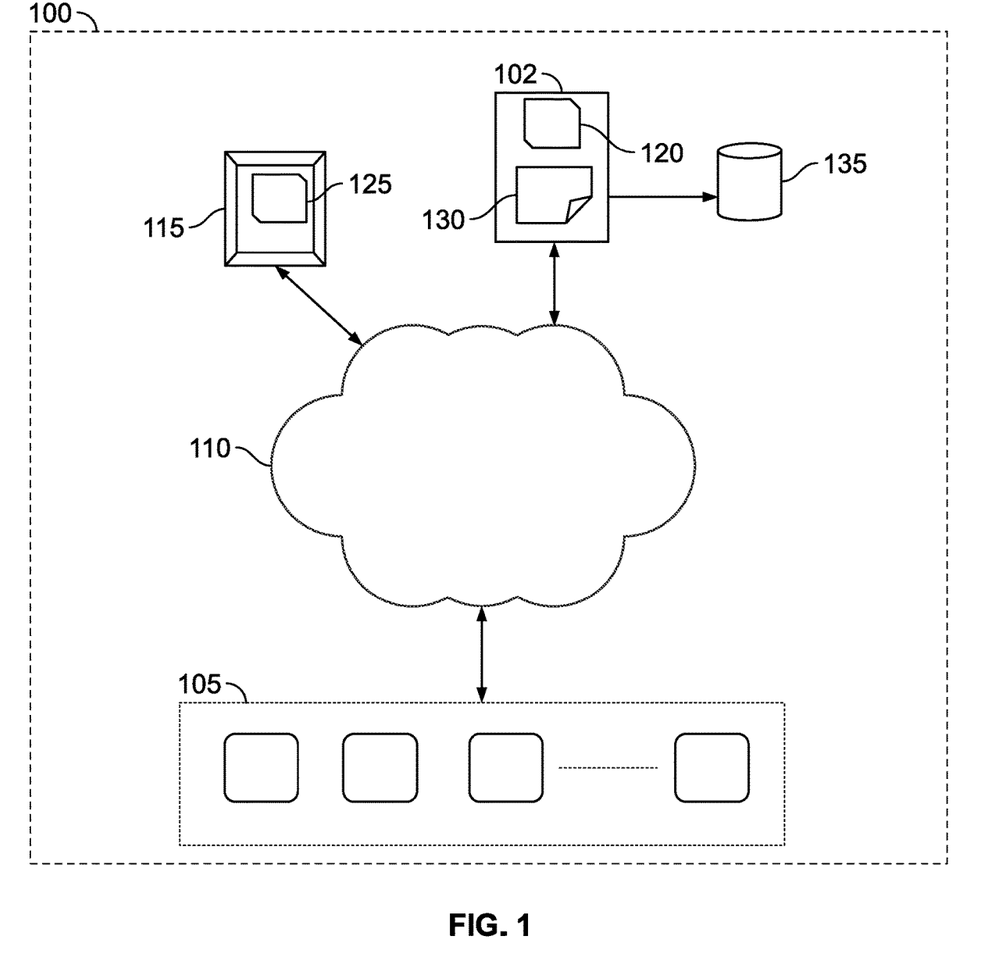
FIG. 1 is a block diagram illustration of a high level client-server architecture of a system for implementing embodiments of tracking phishing websites and identifying offenders associated with the phishing websites.

FIG. 1 is a block diagram illustration of a high-level client-server architecture of a system 100 for implementing embodiments of tracking phishing websites and identifying offenders associated with the phishing websites. In some embodiments, the system 100 includes at least one server 102 and one or more user computing devices 105 configured for data communication with the at least one server 102 via a wired and/or wireless network 110, such as an intranet or the Internet. The system 100 also includes at least one criminal computing device 115 that can be in data communication, via the network 110, with the at least one server 102 and with the one or more user computing devices 105.

In various embodiments, the one or more user computing devices 105 and the at least one criminal computing device 115 may implement one or more applications such as, but not limited to, a web browsing application to generate a web browser user interface, and a messaging application such as, for example, an email, instant messaging and/or social networking application to generate a messaging user interface. In embodiments, the one or more applications are configured to communicate with at least one website 120 hosted on the at least one server 102.

In embodiments, the at least one website 120 is representative of a legitimate website that a user computing device 105 may access for logging-in using his confidential information (hereinafter referred to as 'user data') such as, for example, user credentials for online access (for example, username, password, and login verification code), personal information (for example, mobile number, birth date, mother's and maiden name, registered email) and/or financial information (for example, credit card details, bank account number, and bank customer ID). In embodiments, the at least one criminal computing device 115 hosts a fake or phishing website 125 that impersonates the legitimate website 120.

The criminal computing device 115 may carry out a phishing attack by sending an electronic message such as, for example, an email to the user computing device 105. The email may contain a link to the phishing website 125 causing the user of the computing device 105 to unsuspectingly click on the link and visit the phishing website 125. Consequently, the phishing website 125 harvests the user's confidential information when the user (victim) unknowingly signs in using his credentials (for the legitimate website 120) at the phishing website 125.

Phishing websites (such as the website 125) are characterized by their striking similarity with legitimate websites (such as the website 120) so much so that a victimized user interacts with the phishing website under a false impression that he is interacting with the legitimate website. In other words, for phishing to be successful a criminal ensures that the look and feel of his phishing website closely resembles that of the legitimate website. In order to achieve such resemblance or similarity, the present specification recognizes that a criminal is motivated to download a target webpage or interface (that is, the webpage or interface that needs to be target for a phishing operation) of a legitimate website (such as the website 120) and modify the target webpage to generate a fake webpage (or phishing webpage) to capture user data—thereby ensuring that the look and feel of the fake webpage resembles that of the original target webpage.

In embodiments, the target webpage may be a login webpage, a homepage with navigation to a login webpage (in which case there are two target webpages that need to be impersonated—a homepage and a login webpage) or any other landing webpage or GUI (graphical user interface) that enables the user to either input his user data or navigate to another webpage or interface to input his user data in order to access a website. In other words, the target webpage is one that is likely to be a target of a phishing attack and wherein users are required to input their credentials or user data. It should be appreciated that the number of target webpages that the criminal may need to fake would depend at least on how the legitimate website must be navigated to reach to the login webpage.

Referring back to FIG. 1, a criminal may use his computing device 115 to download at least one target webpage or interface code of the legitimate website 120, modify the at least one target webpage or interface code to generate at least one fake webpage or interface (that is, the phishing webpage or interface) that captures user data and thereafter redirects the user's browser to the legitimate website 120, host the at least one fake webpage or interface on his computing device 115 as the phishing website 125 and send a phishing electronic message (such as, for example, a phishing email), to the user computing device 105, embedded with a fake URL (Uniform Resource Locator) pointing to the phishing website 125 on the criminal's computing device 115. In embodiments, the fake URL typically has a misleading name that resembles the domain name of the legitimate website 120.

In accordance with aspects of the present specification, the at least one server 102 implements a tracking module or engine 130 to track and identify a criminal computing device. In embodiments, the tracking module 130 executes a plurality of sequences of programmatic instructions or code to enable or cause at least one CPU of the at least one server 102 to: receive a request from a computing device 105 or 115 to download at least one target webpage (of the legitimate website 120) using a browsing application on the computing device 105 or 115; extract one or more of a plurality of identification data pertaining to the computing device 105 or 115 from the received request and store the one or more of the plurality of identification data along with an auto-generated unique identifier or primary key associated with the identification data; use at least a sub-set or portion of the extracted identification data to generate fingerprint data of size 'n' bits or use the auto-generated unique identifier or primary key as fingerprint data; encode the fingerprint data into the program code (such as, for example, HTML code, XML code, CSS code, and JavaScript code) and/or data (textual, image, audio and/or video data) associated with the at least one target webpage to generate at least one modified webpage and transmit the modified webpage to the browsing application of the requesting computing device 105 or 115. As a non-limiting example, the fingerprint data may be encoded into the program code. In embodiments, fingerprint data may be encoded or embedded using invisible characters such as spaces or tabs. In various embodiments, the size of the fingerprint data depends at least on the type of data into which the fingerprint data is encoded.

To access the target webpage the browser application of the computing device 105 or 115 typically initiates a TCP connection with the at least one server 102 using a TCP/IP three-way handshake. Once a TCP connection is established for data transmission, the browser application sends a GET (HTTP) request to the at least one server 102 asking it to send a copy of the at least one target webpage. The GET request also contains the plurality of identification data (related to the requesting computing device 105 or 115) such as, for example, IP address, IP-based geo-location (such as, country, state/region, city, Internet Service Provider, time zone, latitude/longitude), TCP/IP fingerprint parameters (to infer the operating system and configuration attributes), HTTP header fields providing information such as browser identification (User-Agent header) and IP Address Whois information.

In some embodiments, the tracking module 130 extracts one or more of the plurality of identification data, from the GET request, in real-time and stores the extracted identification data in a database 135 associated with the at least one server 102. In embodiments, the extracted identification data is tagged or associated with an auto-generated unique identifier or key for storing in the database 135. In embodiments, the unique identifier or key is a numeric, character or an alpha-numeric string. In some embodiments, the unique identifier has a size ranging from 64 bits to 256 bits. In some embodiments, the unique identifier has a size of 'n' bits wherein the bit size is large enough to ensure that the identifier is unique.

In some embodiments, the tracking module 130 uses at least a subset or portion of the extracted identification data to generate fingerprint data in real-time. The generated fingerprint data is also tagged or associated with the unique identifier or key and stored in the database 135. Thus, in accordance with some aspects of the present specification, the fingerprint data is a function of at least a subset or portion of the extracted identification data and therefore of the computing device 105 or 115 requesting the at least one target webpage. In some embodiments, the fingerprint data is a function of a) at least a subset or portion of the extracted identification data and/or b) at least a portion of the unique identifier or key. In some embodiments, the fingerprint data is a function of at least a portion of the unique identifier or key. In some embodiments, a cryptographic hash function, such as, for example, MD5 or SHA-1 (Secure Hash Algorithm 1) may be applied on at least a subset or portion of the extracted identification data and/or at least a portion of the unique identifier in order to generate the fingerprint data. In some embodiments, the fingerprint data corresponds to the unique identifier or key. In embodiments, the fingerprint data is a numeric, character or an alpha-numeric string. In some embodiments, the fingerprint data has a size ranging from 64 bits to 256 bits. In some embodiments, the fingerprint data has a size of 'n' bits wherein the size is large enough to ensure that the identifier is unique.

In some embodiments, the tracking module 130 encodes the fingerprint data, in real-time, into the program code and/or data (textual, image, audio and/or video data) associated with the at least one target webpage to generate at least one corresponding modified webpage. In some embodiments, the tracking module 130 encodes the unique identifier or key, in real-time, into the program code and/or data (textual, image, audio and/or video data) associated with the at least one target webpage to generate at least one corresponding modified webpage. The at least one modified webpage is then transmitted to the browsing application of the requesting computing device 105 or 115.

In accordance with aspects of the present specification, the encoding of the fingerprint data or the unique identifier (also referred to as 'encoded data') is implemented such that the encoded data is substantially concealed, masked or hidden within the program code and/or data (textual, image, audio and/or video data) associated with the at least one modified webpage such that the encoded data is practically invisible or indiscernible to the requesting user and his computing device. Thus, the at least one modified webpage is rendered for viewing on a display of the user's computing device without any human perceptible difference from the at least one target webpage. In various embodiments, the tracking module 130 uses at least one or a combination of the following steganographic methods for encoding:

Encoding at least a bit of the fingerprint data or unique identifier in the program/source code or textual data of a webpage by using, for example, a tab instead of a space at one or more locations within the program code and/or textual data (wherein a space corresponds to a '0' bit while a tab corresponds to a '1' bit, for example). Thus, 'n' bits of the fingerprint data or unique identifier can be encoded by using a plurality of tabs and/or spaces at a plurality of locations within the program/source code or textual data of a webpage.

Using an image file (that is preferably downloaded onto the requesting computing device for display along with the requested webpage) and adjusting the color of every $n^{th}$ pixel to correspond to the fingerprint data or unique identifier. Thus, the fingerprint data or unique identifier could be encoded in the resolution and/or color depth of the image file. For example, where a pixel of an RGB image is defined by three bytes for each color, by replacing the 'least significant bit' (LSB) of each byte 3 bits of the fingerprint data or unique identifier could be encoded in each pixel.

Using an audio file (that is preferably downloaded onto the requesting computing device for display along with the requested webpage) and adding the fingerprint data or unique identifier as noise or echo that sounds like it is natively part of the recording.

Using a video file (that is preferably downloaded onto the requesting computing device for display along with the requested webpage) and adding the fingerprint data or unique identifier in the form of metadata or steganography techniques on images or sound. As an example, a color in every nth pixel of an image may be adjusted to correspond to fingerprint data or unique identifier, in a manner that produces a subtle change that may not be detected by the user. Other examples include, but are not limited to concealing data within images or sound files; embedding images, such as fingerprint images in video material; and/or modifying the echo of a sound file. Additional examples include: executing one or more programmatic instructions to a) modify an attribute of one or more pixels, wherein the attributes comprise color, brightness, hue, saturation, dimension, bit depth (i.e. how many shades or colors can be contained), grayscale, or contrast, b) a) modify a pattern of a plurality of pixels, wherein the pattern modifies at least one of color, brightness, hue, saturation, dimension, bit depth (i.e. how many shades or colors can be contained), grayscale, or contrast for the plurality of pixels, and/or c) inserting one or more visually imperceptible or aurally imperceptible signals into the video file.

Figure 2A:
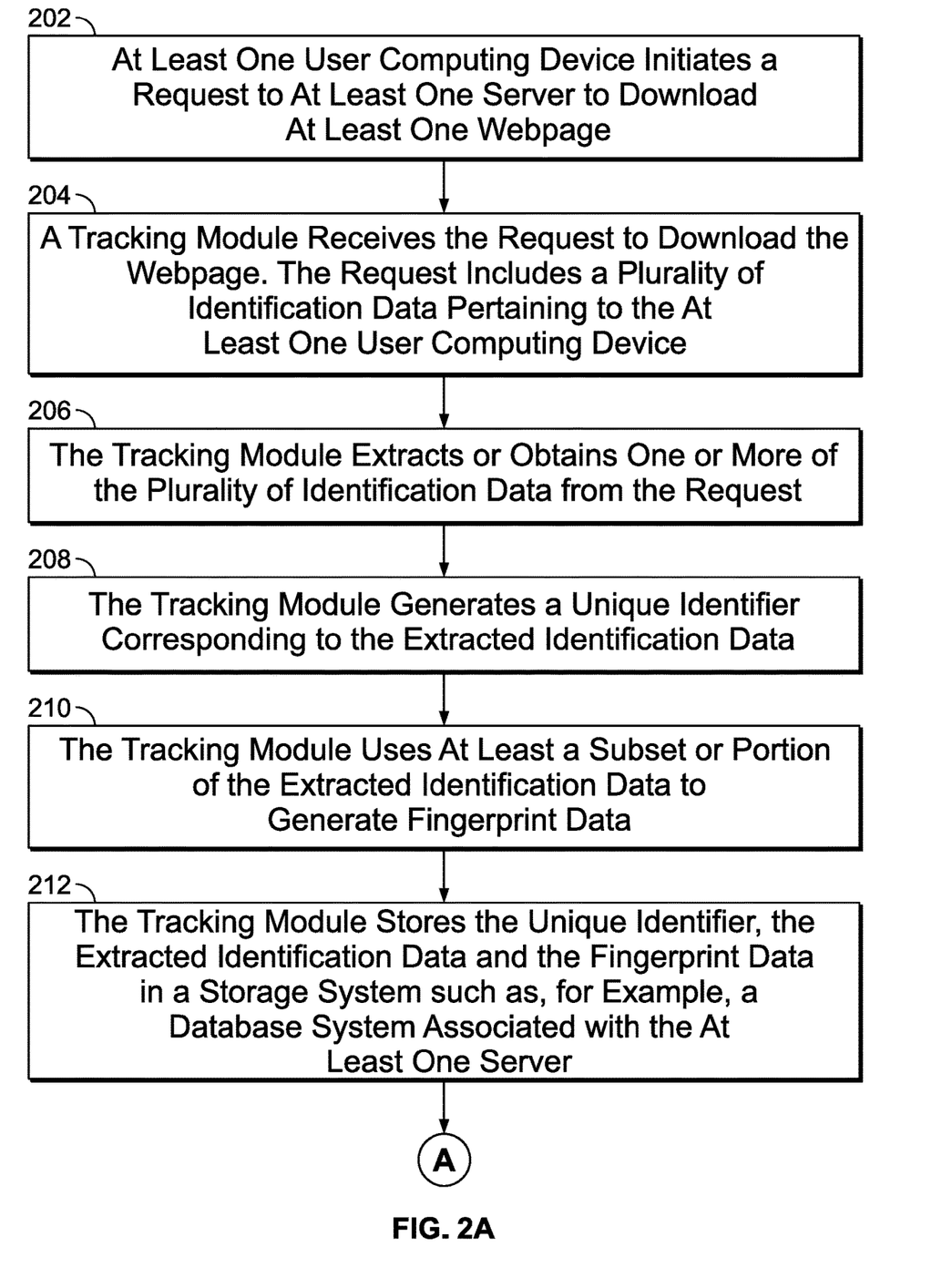
FIG. 2A is a flowchart illustrating a method for tracking and identifying a phishing website, in accordance with some embodiments of the present specification.

FIG. 2A is a flowchart of a method of tracking and identifying a phishing website, in accordance with some embodiments of the present specification. In embodiments, the method is executed by a tracking module or engine (such as, the tracking module or engine 130 of FIG. 1), in at least one server, to track phishing activity associated with at least one webpage hosted as part of a legitimate website on the at least one server that is in data communication with at least one user computing device over a network.

At step 202, the at least one user computing device initiates a request to the at least one server to download the at least one webpage. At step 204, the tracking module receives the request to download the webpage. The request also includes a plurality of identification data pertaining to the at least one user computing device. In various embodiments, the plurality of identification data includes IP address, IP-based geo-location, TCP/IP fingerprint parameters, HTTP header fields and IP Address Whois data. At step 206, the tracking module extracts or obtains one or more of the plurality of identification data from the request.

At step 208, the tracking module generates a unique identifier corresponding to the extracted identification data. In various embodiments, the unique identifier is a numeric, character or an alphanumeric string. At step 210, in some embodiments, the tracking module uses at least a subset or portion of the extracted identification data to generate fingerprint data. In some embodiments, the tracking module uses a) at least a subset or portion of the extracted identification data and/or b) at least a portion of the unique identifier or key in order to generate fingerprint data. In some embodiments, the tracking module uses at least a portion of the unique identifier portion of the unique identifier or key in order to generate fingerprint data. In some embodiments, a cryptographic hash function, such as, for example, MD5 or SHA-1 (Secure Hash Algorithm 1) may be applied on at least a subset or portion of the extracted identification data in order to generate fingerprint data. In some embodiments, the cryptographic hash function may be applied on at least a subset or portion of the extracted identification data and at least a portion of the unique identifier or key in order to generate fingerprint data. In some embodiments, the cryptographic hash function may be applied on at least a portion of the unique identifier or key in order to generate fingerprint data.

In various embodiments, a size of the fingerprint data ranges from 64 bits to 256 bits. At step 212, the tracking module stores the unique identifier, the extracted identification data and the fingerprint data in a storage system such as, for example, a database system associated with the at least one server. In embodiments, the stored unique identifier bears an association with the extracted identification data and the fingerprint data.

At step 214, the tracking module encodes the fingerprint data into a program/source code and/or data associated with the webpage to generate a modified webpage. In various embodiments, the data includes textual, image, audio and/or video data. In embodiments, the encoding ensures that the fingerprint data is undetectable or concealed within the program code and/or data. In embodiments, the encoding comprises at least one of a) adding the fingerprint data to the program code and/or data, and b) replacing a portion of the program code and/or data with the fingerprint data. At step 216, the modified webpage is transmitted from the at least one server to the user computing device in response to the request.

At step 217, if it is discovered that the user computing device is hosting the modified webpage for phishing activity on a fake website, the tracking module analyzes the modified webpage in accordance with the following steps (else the method flow ends at step 226): at step 218, the tracking module downloads the modified webpage from the fake website and decodes the modified webpage to retrieve the fingerprint data. At step 220, the tracking module accesses the unique identifier associated with the retrieved fingerprint data from the storage system. At step 222, the tracking module also accesses the identification data (from the storage system) using the accessed unique identifier. Finally, at step 224, the tracking module identifies the user computing device (that is, the criminal computing device) based on the accessed identification data.

Figure 2B:
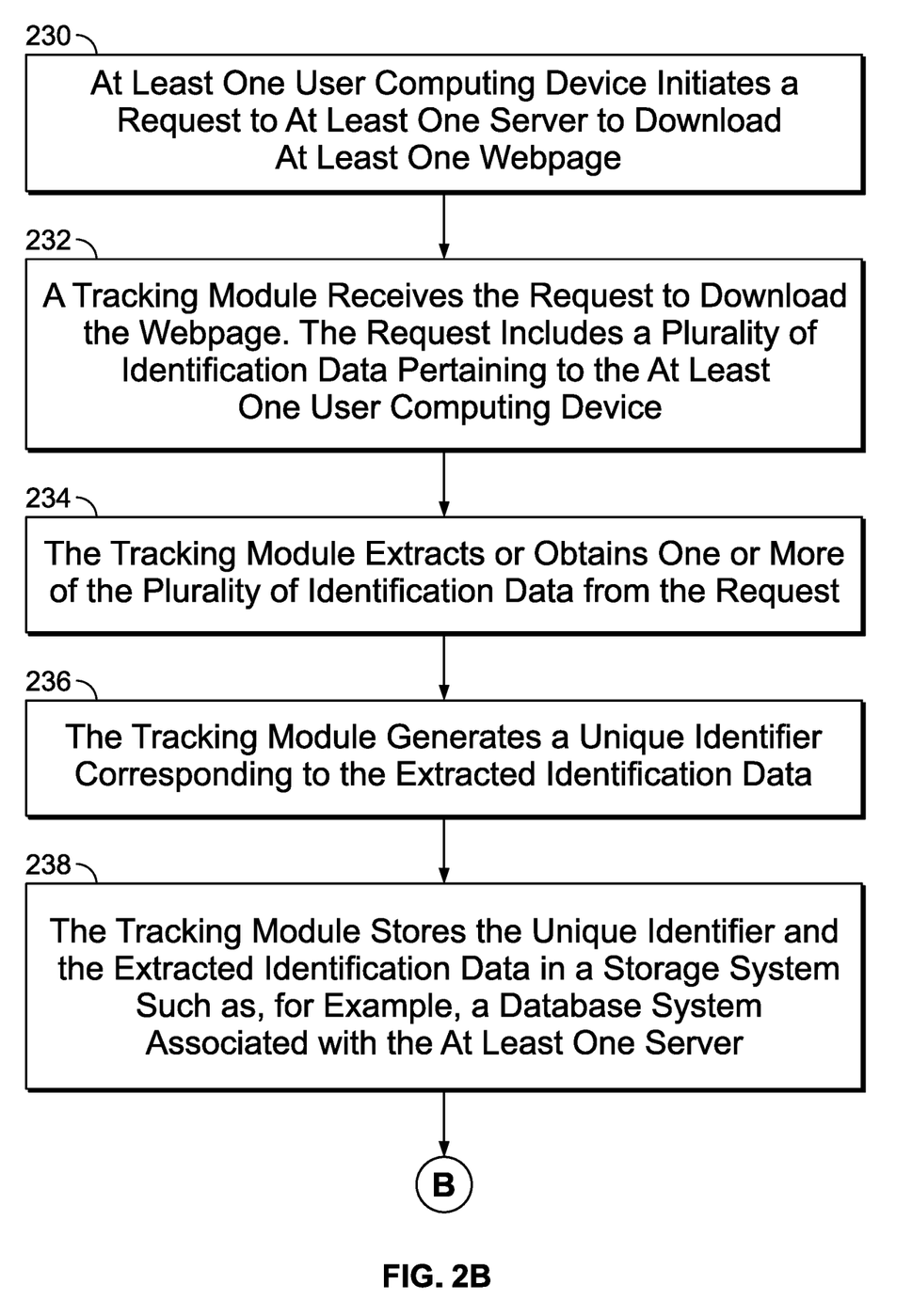
FIG. 2B is a flowchart illustrating another method for tracking and identifying a phishing website, in accordance with some embodiments of the present specification.

FIG. 2B is a flowchart of another method of tracking and identifying a phishing website, in accordance with some embodiments of the present specification. In embodiments, the method is executed by a tracking module or engine (such as, the tracking module or engine 130 of FIG. 1), in at least one server, to track phishing activity associated with at least one webpage hosted as part of a website on the at least one server that is in data communication with at least one user computing device over a network.

At step 230, the at least one user computing device initiates a request to the at least one server to download the at least one webpage. At step 232, the tracking module receives the request to download the webpage. The request also includes a plurality of identification data pertaining to the at least one user computing device. In various embodiments, the plurality of identification data includes IP address, IP-based geo-location, TCP/IP fingerprint parameters, HTTP header fields and IP Address Whois data. At step 234, the tracking module extracts or obtains one or more of the plurality of identification data from the request.

At step 236, the tracking module generates a unique identifier corresponding to the extracted identification data. In various embodiments, the unique identifier is a numeric, character or an alphanumeric string. At step 238, the tracking module stores the unique identifier and the extracted identification data in a storage system such as, for example, a database system associated with the at least one server. In embodiments, the stored unique identifier bears an association with the extracted identification data. In various embodiments, a size of the unique identifier ranges from 64 bits to 256 bits.

At step 240, the tracking module encodes the unique identifier into a program/source code and/or data associated with the webpage to generate a modified webpage. In various embodiments, the data includes textual, image, audio and/or video data. In embodiments, the encoding ensures that the unique identifier is undetectable or concealed within the program code and/or data. In embodiments, the encoding comprises at least one of a) adding the unique identifier to the program code and/or data, and b) replacing a portion of the program code and/or data with the unique identifier. At step 242, the modified webpage is transmitted from the at least one server to the user computing device in response to the request.

At step 244, if it is discovered that the user computing device is hosting the modified webpage for phishing activity on a fake website, the tracking module analyzes the modified webpage in accordance with the following steps (else the method flow ends at step 252): at step 246, the tracking module downloads the modified webpage from the fake website and decodes the modified webpage to retrieve the unique identifier. At step 248, the tracking module accesses the identification data (from the storage system) using the retrieved unique identifier. Finally, at step 250, the tracking module identifies the user computing device (that is, the criminal computing device) based on the accessed identification data.

The above examples are merely illustrative of the many applications of the methods and systems of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. A computer-implemented method of tracking phishing activity targeting a webpage that is part of a website which is hosted on at least one server, wherein the at least one server is in data communication with at least one user computing device over a network and wherein the at least one user computing device is configured to initiate a request to the at least one server to download the webpage, the method comprising:

receiving, at the at least one server, the request to download the webpage, wherein the request includes identification data pertaining to the at least one user computing device;

extracting, at the at least one server, one or more of the identification data from the request;

generating, at the at least one server, a unique identifier corresponding to the one or more of the identification data;

using, at the at least one server, at least a subset of the one or more of the identification data to generate fingerprint data wherein a size of the fingerprint data ranges from 64 bits to 256 bits;

storing, at the at least one server, the unique identifier, the one or more of the identification data, and the fingerprint data, wherein the unique identifier is stored in association with the one or more of the identification data and the fingerprint data;

encoding, at the at least one server, the fingerprint data into a program code and/or data associated with the webpage to generate a modified webpage, wherein the encoding comprises at least one of adding the fingerprint data to the program code and/or data or replacing a portion of the program code and/or data with the fingerprint data and wherein, after the encoding, the fingerprint data within the program code and/or data is visually undetectable by humans; and transmitting the modified webpage with the fingerprint data from the at least one server to the user computing device in response to the request.

2. The computer-implemented method of claim 1, wherein the one or more of the identification data comprises at least one of an IP address of the user computing device, an IP-based geo-location of the user computing device, TCP/IP fingerprint parameters, HTTP header fields or IP Address Whois data.

3. The computer-implemented method of claim 1, further comprising:

downloading, at the at least one server, the modified webpage from a potentially phishing website;

decoding, at the at least one server, the modified webpage to retrieve the fingerprint data;

accessing, at the at least one server, the unique identifier associated with the retrieved fingerprint data;

accessing, at the at least one server, the one or more of the identification data using the accessed unique identifier; and identifying the user computing device based on the accessed one or more of the identification data.

4. A computing system configured to track phishing activity targeting a webpage that is part of a website comprising:

at least one server, wherein the at least one server is in data communication with at least one remotely located user computing device over a network, wherein the at least one server is configured to receive a request from the at least one remotely located user computing device to acquire data indicative of the webpage, and wherein the at least one server comprises at least one hardware processor and programmatic instructions that, when executed by the at least one hardware processor:

receives the request to download the webpage, wherein the request includes identification data pertaining to the at least one user computing device;

extracts at least a portion of the identification data from the request;

generates a unique identifier corresponding to the portion of the identification data;

stores the unique identifier and the portion of the identification data, wherein the unique identifier bears an association with said one or more of the plurality of identification data and wherein a size of the unique identifier ranges from 64 bits to 256 bits;

encodes the unique identifier into a program code and/or data associated with the webpage by adding the unique identifier to the program code and/or data or replacing a portion of the program code and/or data with the unique identifier such that the unique identifier is visually undetectable by a human in the program code of the webpage or in the rendered version of webpage, thereby generating a modified webpage; and transmits the modified webpage from the at least one server to the user computing device in response to the request.

5. The computing system of claim 4, wherein the identification data comprises at least one of an IP address of the at least one user computing device, an IP-based geo-location of the at least one user computing device, TCP/IP fingerprint parameters indicative of the at least one user computing device, HTTP header fields indicative of the at least one user computing device and IP Address Whois data indicative of the at least one user computing device.

6. The computing system of claim 4, wherein the programmatic instructions, when executed by the at least one hardware processor:

downloads the modified webpage from a potentially phishing website;

decodes the modified webpage to retrieve the fingerprint data;

accesses the unique identifier associated with the retrieved fingerprint data;

accesses the one or more of the identification data using the accessed unique identifier; and identifies the user computing device based on the accessed one or more of the identification data.

* * * * *